United States Patent
Karabulut Kurt et al.

(10) Patent No.: US 10,117,132 B2
(45) Date of Patent: Oct. 30, 2018

(54) COOPERATIVE, NETWORK CODED, DISTRIBUTED WIRELESS COMMUNICATION AND DATA STORAGE METHOD

(71) Applicant: ISTANBUL TEKNIK UNIVERSITESI, Istanbul (TR)

(72) Inventors: Gunes Zeynep Karabulut Kurt, Istanbul (TR); Semiha Tedik Basaran, Istanbul (TR)

(73) Assignee: ISTANBUL TEKNIK ÜNIVERSITESI, Istanbul (TR)

(*) Notice: Subject to any disclaimer, the term of this patent is extended or adjusted under 35 U.S.C. 154(b) by 0 days.

(21) Appl. No.: 15/552,801

(22) PCT Filed: May 6, 2016

(86) PCT No.: PCT/TR2016/050139
§ 371 (c)(1),
(2) Date: Aug. 22, 2017

(87) PCT Pub. No.: WO2016/182522
PCT Pub. Date: Nov. 17, 2016

(65) Prior Publication Data
US 2018/0027449 A1    Jan. 25, 2018

(30) Foreign Application Priority Data
May 11, 2015 (TR) .............................. a 2015 05648

(51) Int. Cl.
*H04W 28/08* (2009.01)
*H04B 7/14* (2006.01)
*H04W 40/12* (2009.01)
*H04L 29/08* (2006.01)
*H04L 29/06* (2006.01)

(52) U.S. Cl.
CPC .............. *H04W 28/08* (2013.01); *H04B 7/14* (2013.01); *H04L 67/1097* (2013.01);
(Continued)

(58) Field of Classification Search
CPC ..... H04L 29/06; H04L 29/08; H04L 67/1002; H04L 67/1097; H04L 67/2823;
(Continued)

(56) References Cited

U.S. PATENT DOCUMENTS 8,204,086 B2 * 6/2012 Luo .................... H04B 7/15521
                                                    370/319
8,780,693 B2 * 7/2014 Kim ....................... G06F 15/16
                                                    370/216
(Continued)

OTHER PUBLICATIONS

Gunes Karabulut Kurt, Department of Electronics and Communications Engineering, Istanbul Technical University, "Network Coding in Wireless Systems: Impact of Wireless Links", ALCOMA (Algebraic Combinatorics and Applications Conference) 15, Mar. 19, 2015, pp. 1-44, XP055297763.
(Continued)

*Primary Examiner* — Tri H Phan
(74) *Attorney, Agent, or Firm* — Hershkovitz & Associates, PLLC; Abe Hershkovitz

(57) ABSTRACT

A wireless communication and data storage method enables data present at the source unit to be stored at storage units by a relay unit, comprising distributing data packets to a wireless communication interface inside a source unit via a load balancing data packer according to previously defined success criteria, transmitting data packets wirelessly to a relay unit and storage unit if it is decided to realize network coding at the relay unit, coding and repacking data that is unpacked at the network coding unit if it is decided not to realize network coding, transmitting it to the load balancing data packer using relaying techniques, dividing data that is network coded or transmitted using the relaying techniques into data packets, transmitting the data packets wirelessly to
(Continued)

the storage unit, decoding, merging data packets at the network decoding unit in the storage unit, and storing them at the data storage unit.

7 Claims, 4 Drawing Sheets

(52) U.S. Cl.
CPC .......... *H04L 67/2823* (2013.01); *H04L 69/14* (2013.01); *H04W 40/12* (2013.01); *H04L 67/1002* (2013.01)

(58) Field of Classification Search
CPC ...... H04L 69/14; H04W 28/08; H04W 40/01; H04W 40/12; H04B 7/14
See application file for complete search history.

(56) References Cited

U.S. PATENT DOCUMENTS

| | | | | |
|---|---|---|---|---|
| 9,537,759 | B2* | 1/2017 | Calmon | H04B 7/15521 |
| 2005/0152391 | A1* | 7/2005 | Effros | H04L 67/2823 |
| | | | | 370/432 |
| 2008/0225751 | A1* | 9/2008 | Kozat | H04L 12/1881 |
| | | | | 370/254 |
| 2011/0110288 | A1* | 5/2011 | Manssour | H04B 7/15521 |
| | | | | 370/315 |
| 2014/0380133 | A1* | 12/2014 | Kim | H04L 1/0041 |
| | | | | 714/776 |
| 2016/0065685 | A1* | 3/2016 | Kurihara | H04L 1/08 |
| | | | | 714/748 |

OTHER PUBLICATIONS

Dan-Cristian Tomozei, "Wireless Protocols Using Network Coding: Report on State-of-the-Art," The N-Crave Consortium, Jan. 22, 2009, pp. 1-29, XP002606798 (URL:http://www.n-crave.eu/images/pdf/D2.1.pdf).

Hsiao-Chen Lu et al., "Cooperative multicasting in network-coding enabled multi-rate wireless relay networks," INFOCOM, 2012 Proceedings, IEEE, Mar. 25, 2012, pp. 334-342, XP032179131.

International Search Report and Written Opinion dated Sep. 5, 2016 in PCT/TR2016/050139.

* cited by examiner

COOPERATIVE, NETWORK CODED, DISTRIBUTED WIRELESS COMMUNICATION AND DATA STORAGE METHOD

FIELD OF THE INVENTION

The present invention relates to a cooperative, network coded, distributed wireless communication and data storage method.

BACKGROUND OF THE INVENTION

In our day and age, the diversity of the devices that utilize digital data source increases continuously. In the same manner, the frequency of usage of the data sharing media by the end users increases at the same rate. Storing and backing up of these rapidly increasing digital content data have become an important necessity. As a result of the wireless communication techniques becoming widespread, the necessity of storing the data can be performed wirelessly.

In the cooperative communication and storage techniques that are present in the state of the art, no precautions against the distorting effects of the wireless communication channel have been taken. For this reason, power efficiencies, spectral efficiencies and success performances of the systems could not go up to the highest levels that the system might reach. Additionally, in the cooperative communication techniques, it is not directly possible to scale multiple sources using standard transmission protocols. In addition to this, even if the said scaling is desired to be realized, situations where the designers of the network coding system are needed to interfere with the system, might arise.

Besides, since no multiple communication interfaces are defined in the cooperative communication techniques that are present in the state of the art before this invention, the using of devices of different type with the system might be restricted, and, at the same time, accessing the maximum level of diversity level that might be reached, might be restricted.

Additively, in the systems that are present before this invention, cross-layer optimizations such as power adjustment during the transmission via the wireless channel, or, increasing the data transmission rate, could not be realized, this, in turn, restricts the system flexibility and the efficiency.

In the embodiments of the invention, a cooperative, network coded, distributed wireless communication and data storage method, in which the above mentioned problems are solved, is realized. Data transmission over the wireless communication channel is realized. The data are stored in storing units that are used in a distributed manner, having one or multiple communication interfaces. Data that are present in one or multiple sources can be transmitted and stored. Moreover, the effects of the transmission errors caused by the distorting effects of the wireless communication channel can be reduced by using relay units. For this purpose, cooperative communication protocols and/or network coding techniques are used.

BRIEF DESCRIPTION OF THE FIGURES

For an exemplary embodiment of the subject matter wireless communication and data storage method to be further understood, said embodiment is illustrated in the figures annexed. The details of the embodiments of the subject matter of invention should be evaluated by keeping the whole specifications into consideration; where.

Figure 1:
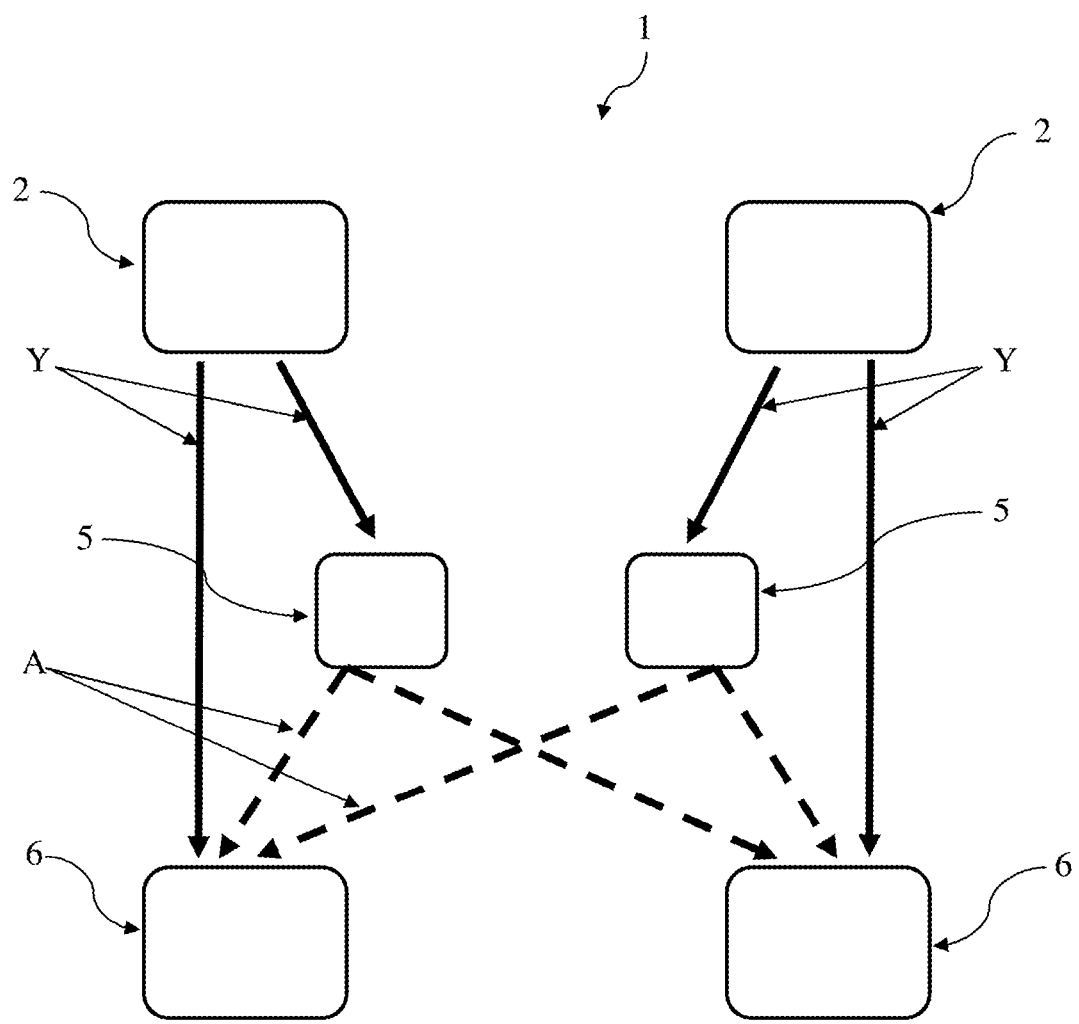
FIG. 1. Schematic model of an embodiment of the wireless communication and data storage method.
Figure 2:
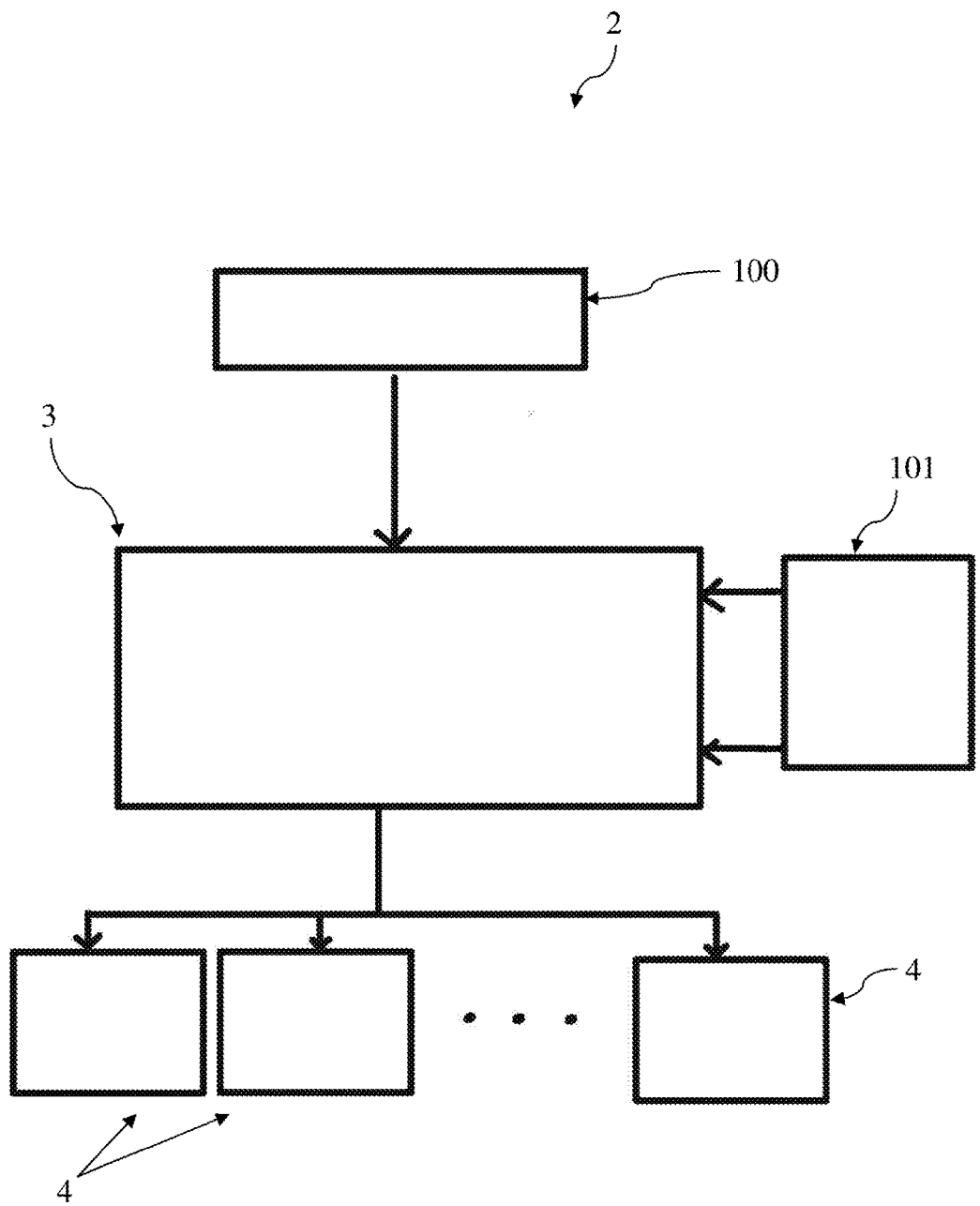
FIG. 2. Flowchart of the data at the source unit.
Figure 3:
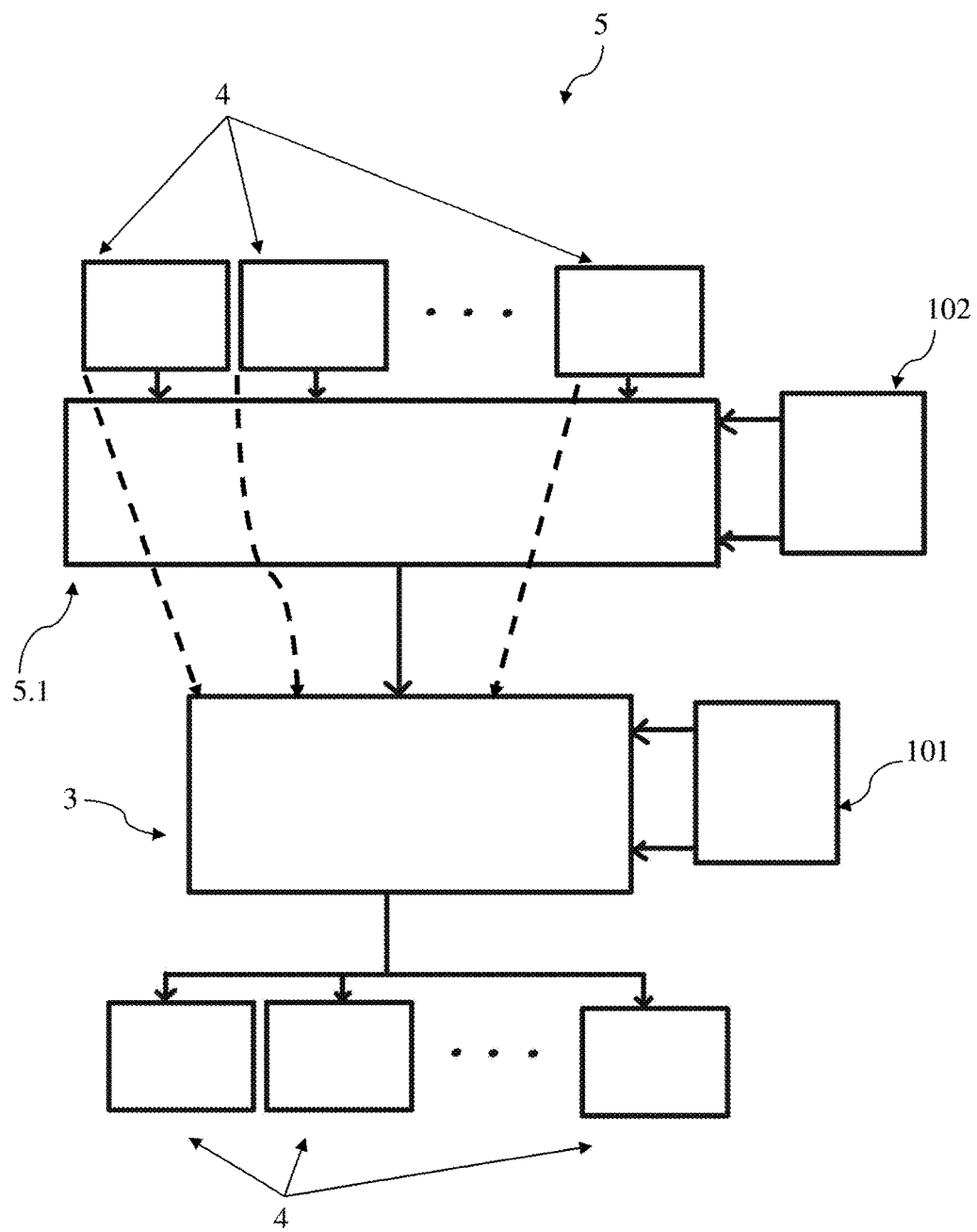
FIG. 3. Flowchart of the data at the relay unit.
Figure 4:
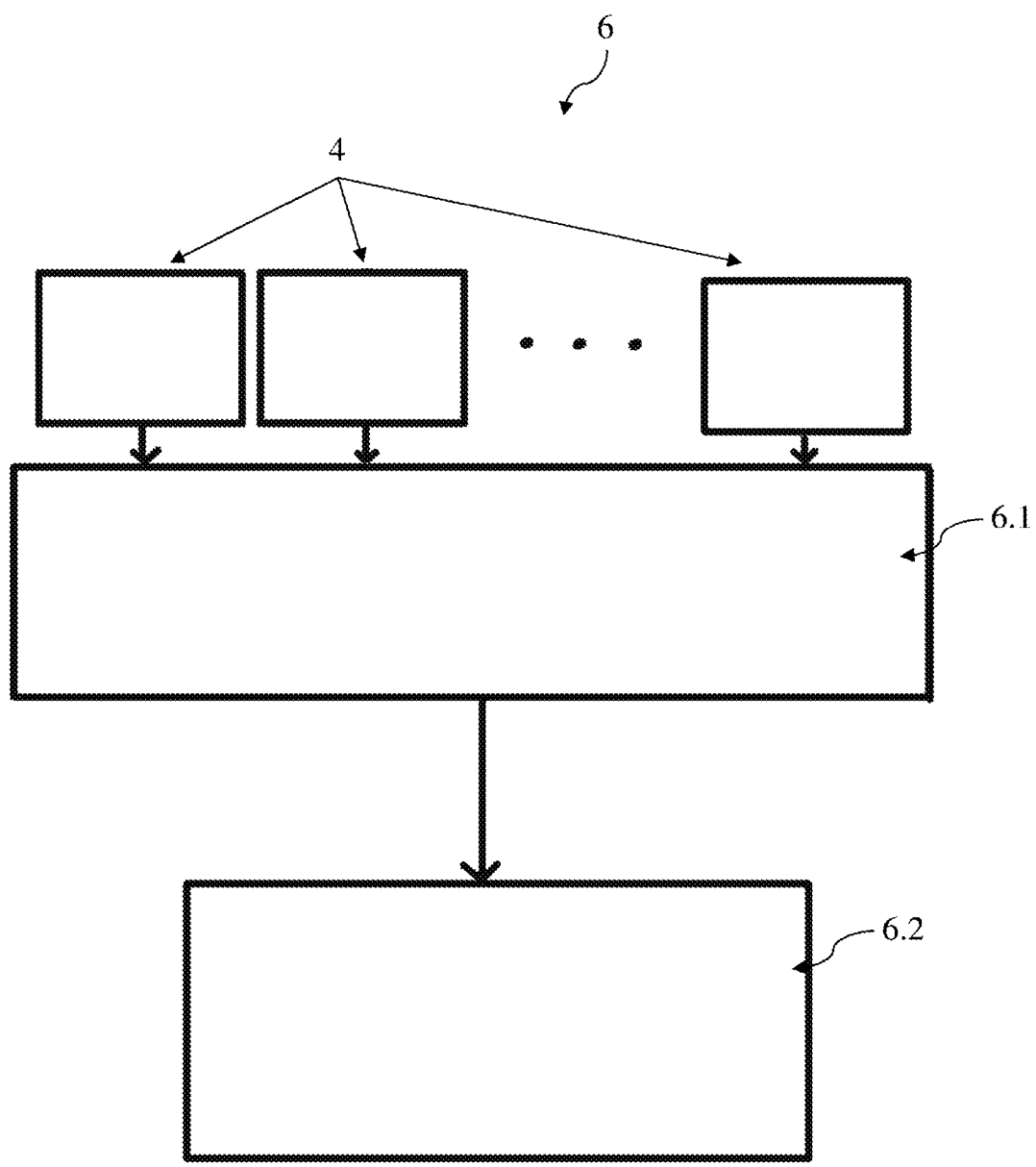
FIG. 4. Flowchart of the data at the storage unit.

Elements shown in the figures are individually numbered, and the correspondence of these numbers is given as follows:

1. Wireless communication and data storage method
2. Source unit
3. Load balancing data packer
4. Wireless communication interface
5. Relay unit
5.1. Network coding unit
6. Storage unit
6.1. Network decoder unit
6.2. Data storage unit
100. Data to be stored
101. System information
102. Network topology information
B. Broadcast phase
R. Relaying phase

DETAILED DESCRIPTION OF THE INVENTION

The inventive wireless communication and data storage method (1) relates to saving data that is present on one or multiple source units (2) to distributed storage units (6) by the help of one or multiple relay units (5), using cooperative communication protocols and/or network coding techniques.

It relates to a wireless communication and data storage method (1) enabling the data that is present at the source unit (2) to be stored at the storage units (6) by the help of the relay unit (5), using cooperative communication protocols and/or network coding techniques, reducing the transmission errors caused by the distorting effects of the wireless communication channel; comprising the steps of; dividing the data that is present at the source unit (2) into data packets at the load balancing data packer (3) that is inside the source unit (2) using the system information (101), distributing the data packets to the wireless communication interface (4) that is inside the source unit (2) via the load balancing data packer (3) according to the previously defined success criteria, transmitting the data packets wirelessly to the relay unit (5) and storage unit (6) in the broadcast phase also known as multiple access phase (B) via the wireless communication interface (4) that is inside the source unit (2), taking the data packets to the relay units (5) through the wireless communication interface (4) at the relay units (5), detecting the data packets at the relay unit (5), deciding if the network coding is going to be realized or not at the relay unit (5) according to the network topology information (102), if it is decided to realize network coding, unpacking the detected data packets in the network coding unit (5.1) that is inside the relay unit (5), coding and merging the unpacked data, using network topology information (102), afterwards, transmitting it to the load balancing data packer (3) that is inside the relay unit (5), if it is decided not to realize network coding, unpacking the detected data packets, transmitting it to the load balancing data packer (3) that is inside the relay unit (5) using transmitting techniques, dividing the data that is network coded or that is transmitted using the transmitting techniques into data packets, at the load balancing data packer (3) that is present in the relay units (5), using the system information (101), distributing the data packets to the wireless communication interface (4) that is inside the relay unit (5) via the load balancing data packer (3) according to the previously defined success criteria, transmitting the data packets wirelessly to the storage unit (6) in the relaying phase (R) via the wireless communication interface (4) that is inside the relay unit (5), taking the data packets that are transmitted in the broadcast phase (B) and the relaying phase (R), into the storage unit (6) via the at least one wireless communication interface (4) that is present in the storage unit (6), decoding the data that are incident from both phases, by the network decoding unit (6.1) that is present in the storage unit (6), merging the decoded data at the storage unit (6), storing the merged data at the data storage unit (6.2) that is present in the storage unit (6).

In the embodiments of the subject matter of invention, data present at one or multiple source units (2) that can wirelessly communicate via wireless communication and data storage method (1), is transmitted to distributed storage units (6) that are adapted to wirelessly receive data, in order to be stored.

The communication realized in order to store the data that is present in one or multiple source units (2) into the storage units (6) is completed in two phases, that are broadcast phase (B) and relaying phase (R), thus providing a cooperative communication. First, during the broadcast phase (B), the data present at the source units (2) are transmitted to the storage units (6) and to the relay units (5) at the same time. Afterwards, the data that have been transmitted to the relay units (5) from different source units (2) are transmitted to the storage units using relaying techniques or network coding techniques during the relaying phase (R). Thereby, both the data that are transmitted from the source units (2) during the broadcast phase (B), and the data that are transmitted via the relay units (5) during the relaying phase (R) will be present on the storage units (6). Afterwards, data that are incident from two phases will be merged in accordance with the transmission quality of the transmission lines, and following the merging process, they will be stored in the storage unit (6).

Wireless phones, mobile phones, smart phones, tablets, laptop or desktop computers, smart watches, smart whiteboards, streaming devices could be given as examples to such source units (2). The source unit (2) is not limited by these examples, and it can be in the form of any device that has the ability to communicate wirelessly. At least one wireless communication interface (4) is present at the source units (2). The wireless communication interfaces (4) in the application of the invention, could be formed using the already present standards (for example WiFi, Wimax, Bluetooth, Zigbee, 2G, EDGE, 3G, HSPA, 4G, etc.) as well as being formed using a proprietary standard. One or multiple wireless communication interfaces (4) might be used during the data transmission from the source unit (2) to the storage units (6) or relay unit (5) on the broadcast phase (B). On each of the wireless communication interfaces (4) to be used, the same or different wireless communication standards might be utilized.

At least one wireless communication interface (4) is present at the relay units (5). These wireless communication interfaces (4) could be formed using the already present standards (for example WiFi, Wimax, Bluetooth, Zigbee, 2G, EDGE, 3G, HSPA, 4G, etc.) as well as being formed using a proprietary standard. One or multiple wireless communication interfaces (4) might be used during the receiving the data from the source units (2) and transmitting the data from the relay unit (5) to the storage units (6). On each of the wireless communication interfaces (4) to be used, the same or different wireless communication standards might be utilized. This structure enables the data to be transmitted from the wireless communication channel to be transmitted at higher transmission rates. Even if the same standards (for example 802.11n) are used, the data transmission rates on the wireless communication interfaces (4) that can be used for wireless communication, might differ from each other. For example, selecting empty or half full channels might affect data transmission rate. While the data transmission rate from an empty channel would be higher, the data transmission rate from a half full channel might be lower. Additionally, the data transmission rate could be increased by using different standards and appropriate selection of the standards (for example using WiFi instead of Zigbee).

The data communication between the source units (2), storage units (6) and relay units (5) during the broadcast phase (B), and the data communication between the relay units (5) and the storage units (6) during the relaying phase (R) are realized via wireless communication interfaces (4).

Load balancing data packer (3) is present inside the source units (2). The load balancing data packer (3) that is present in the applications of the invention, divides the data into data packets using the system information (101), and distributes the data packets it has formed to the wireless communication interfaces (4). The load balancing data packer (3) that is present in the source unit (2), divides the data that are present at the source unit (2) into data packets using the system information (101). The system information (101) consists of the information belonging to the layers of the OSI reference model. In the preferred embodiment of the invention, the system information (101) comprises first (physical layer), second (data link layer), third (network layer) and seventh (application layer) of the OSI reference model. The rate of the data that are transmitted from different wireless communication interfaces (4) might differ according to the communication standards and the communication channels. The data transmission rate being different according to the selected wireless communication interface (4), modem configuration and the transmission quality of the channel, changes the data amount that can be sent in every packet. The size of a packet is determined adaptively in accordance with the parameters of the wireless communication interface (4), the transmission quality and the data transmission rate of the channel, the present load level at the wireless communication channel (4) (the amount of data that is already present at the buffer, and that is not yet transmitted).

The data packets formed are distributed to the wireless communication interfaces (4) via the load balancing data packer (3) according to the previously defined success criteria.

For these success criteria;
consuming the lowest power during data transmission
transmitting the data with the maximum transmission power
transmitting the data with the highest transmission rate
transmitting the data with the maximum security
transmitting the data by spending the least energy
transmitting the data by providing the maximum channel diversity order
transmitting the data at the minimum guaranteed rate
transmitting the data with the least latency,
transmitting the data according to a certain quota limitation
transmitting the data with minimum error
transmitting different user data at every interface transmitting the data of the maximum number of source units (2)

can be given as examples but they are not limited to these examples. The parameters of the wireless communication interfaces (4) can be adjusted via the load balancing data packer (3), also according to the previously defined success criteria. What is meant by the parameters of the wireless communication interfaces (4) is the configuration parameters of the wireless communication interfaces (4). Parameters such as the selected standard (for example WiFi-802.11n), transmission channel (for example 3rd channel on the 2.4 GHz band), selected bandwidth (for example 20 MHz), transmission power (for example 10 dB) form the parameters of the wireless communication interfaces (4). As an example, if in an embodiment of the invention "consuming the lowest power during data transmission" is desired as a success criterion and the total latency in the transmission is not of a high importance, communication interfaces having a standard with a low power consumption, such as the least power consuming communication interfaces (4) Bluetooth or Zigbee are used. In another embodiment of the invention, "transmitting the data with the least latency" is desired as a success criterion, a communication standard that provides high data transmission rates, such as 802.11ac, is used in the wireless communication interface (4). In addition to this, wireless communication interface (4) parameters, such as output power, are set such that the data transmission rate is maximized. Packet information and necessary prefixes, together with the data packets, are distributed to the wireless communication interfaces (4) according to one or multiple previously defined success criteria. In this stage, it is possible to transmit the data packets, packet information and the necessary prefixes that are to be transmitted to the storage unit (6) and to the relay unit (5), via the same wireless communication interface (4). Along with this, it is possible to transmit all of the data packets, packet information and the necessary prefixes that are to be transmitted to the storage unit (6) and to the relay unit (5), via separate wireless communication interfaces (4). What is meant here by the said prefixes is the information of at which interface the data packet is and with which order.

Data packets (along with the packet information and the necessary prefixes) are transmitted to the storage unit (6) and to the relay unit (5), through wireless communication interfaces (4) at the broadcast phase (B).

Data packets (along with the packet information and the necessary prefixes) are taken to the relay units (5) through the wireless communication interfaces (4) at the relay units (5). The relay unit (5) later detects (unpacks) the data packets. Detected (unpacked) data that are taken from one or multiple source units (2) might be present in the relay unit (5).

Network coding unit (5.1) is present inside the relay unit (5). If an improvement in the system efficiency is needed, the data packets that are detected (unpacked) using the network topology information (102) are encoded and merged at the network coding unit (5.1). When no improvement in the system efficiency is needed, network coding is not realized, and relaying techniques are applied on the data. Relay unit (5) decides whether to realize network coding or not.

In order to improve the efficiency of the system, linear network coding or complex field network coding might be used for network coding. In the event that no network topology information (102) is present, random network coding can be realized. At the network coding unit (5.1), the data that have been unpacked using coding coefficients, are merged linearly. The network coding unit (5.1) applies a mathematical operation on the data that are unpacked from different packets, using network coding coefficients. This operation consists of multiplication and summation in the finite fields in the network coding techniques. The network coded data comprising also the network coding information are transmitted to the load balancing data packer (3) inside the relay units (5). What is meant by the network coding information is with which coding technique the network coding is realized, and the coding coefficient information that are necessary for decoding the coded data.

If no network coding is going to be realized, the relay unit (5) transmits the decoded data to the load balancing data packer (3) that is inside the relay unit (5), after applying the relaying techniques. "Amplify and forward", "Decode and forward" techniques can be given as examples to the relaying techniques but they are not limited to these examples. In the relaying techniques, the relay unit (5) increases the amplitude of the data packets or decodes and forwards them.

When deciding whether the network coding is going to be realized or not, the relay unit (5) uses the network topology information (102) again. In the event that no network topology information (102) is present, random network coding is realized.

A predefined threshold level for the parameters and information of the wireless communication interface (4) is present at the relay units (5). The relay unit (5) compares the said threshold values with the present parameters and information values of the wireless communication interfaces (4). If the mean of the resultant values are below the threshold value, "relaying techniques" are used. If the said value is above the said threshold value, using the "network coding techniques" is decided.

The network topology information (102) consists of the parameters and information of the wireless communication interfaces (4) that are present at the relay units (5) from which the data packets are received. For the parameters and information of the wireless communication interfaces (4);

signal level
noise ratio
channel attenuation and fading
user density
interference amount at the channel
possible modulation at the physical layer
error control coding set
maximum and minimum allowed transmission power
receiver sensitivity values can be given as examples but they are not limited to these examples. The network topology information (102) for each of the wireless communication interfaces (4) are separately acquired at the relay units (5). If the relay units (5) decide that the efficiency of the system has to be improved according to the network topology information (102), they transmit the unpacked data to the network coding unit (5.1) for realizing network coding. If the relay units (5) decide that the efficiency of the system does not have to be improved according to the network topology information (102), they transmit the unpacked data to the load balancing data packer (3) that is present in the relay units (5) after applying data relaying techniques.

The data, to which the relaying techniques or network coding techniques are applied, are transmitted to the load balancing data packer (3) that is in the relay units (5). The data is divided into packets at the load balancing data packer (3) according to the system information (101), and they are distributed to the wireless communication interfaces (4) that are in the relay units (5) according to the previously defined success criteria. The said data packets are transmitted to the storage units (6) via the wireless communication interfaces (4) during the relaying phase (R) which is the second phase.

Multiple storage units (6) are present at the wireless communication and data storage method (1). The storage units (6) can be present in a distributed manner, at locations that are independent from each other. The data packets that are transmitted during the broadcast phase (B) and the relaying phase (R) are received via the wireless communication interfaces (4) that are present at the storage units (6). There is a network decoding unit (6.1) present at the storage units (6). The network decoding unit (6.1) decodes the data that is incident from the both phases. Afterwards, the decoded data is merged at the storage unit (6). The merged data are stored in the data storage units (6.2) along with the data separation information. The merging process can be realized according to the likelihood values. By the virtue of being able to use multiple interfaces for the transmission of data packets both at the source unit (2) and at the relay units (5), the storage units (6) might store the data to be stored (100) at different source units (2), merging the same or different parts of the data to be stored (100). By this, error performance in the data transmission can be improved. In the wireless communication and data storage method (1) in an application of the invention, sent data can be encrypted inside the storage units (6) in order to provide secure communication.

The invention claimed is:

1. A wireless communication and data storage method (1) enabling storing data that is present on one or multiple source units (2) to storage units (6), reducing the transmission errors caused by the distorting effects of the wireless communication channel, by the help of the relay unit (5), using cooperative communication protocols and/or network coding techniques, characterized by the steps of;

dividing the data that is present at least one source unit (2) into data packets at the at least one load balancing data packer (3) that is inside the source unit (2) using the system information (101), distributing the data packets to the at least one wireless communication interface (4) that is inside the source unit (2) via the load balancing data packer (3) according to the previously defined success criteria, transmitting the data packets wirelessly to the at least one relay unit (5) and at least one storage unit (6) in the broadcast phase (B) via the wireless communication interface (4) that is inside the source unit (2), taking the data packets to the relay units (5) through the at least one wireless communication interface (4) at the relay units (5), detecting the data packets at the relay unit (5), deciding if the network coding is going to be realized or not at the relay unit (5) according to the network topology information (102), if it is decided to realize network coding, unpacking the detected data packets in the network coding unit (5.1) that is inside the relay unit (5), coding and merging the unpacked data, using network topology information (102), afterwards, transmitting it to the load balancing data packer (3) that is inside the relay unit (5), if it is decided not to realize network coding, unpacking the detected data packets, transmitting it to the load balancing data packer (3) that is inside the relay unit (5) using transmitting techniques, dividing the data that is network coded or that is transmitted using the transmitting techniques into data packets, at the load balancing data packer (3) that is present in the relay units (5), using the system information (101), distributing the data packets to the at least one wireless communication interface (4) that is inside the relay unit (5) via the load balancing data packer (3) according to the previously defined success criteria, transmitting the data packets wirelessly to the storage unit (6) in the relaying phase (R) via the wireless communication interface (4) that is inside the relay unit (5), taking the data packets that are transmitted in the broadcast phase (B) and the relaying phase (R), into the storage unit (6) via the at least one wireless communication interface (4) that is present in the storage unit (6), decoding the data that are incident from both phases, by the at least one network decoding unit (6.1) that is present in the storage unit (6), merging the decoded data at the storage unit (6), storing the merged data at the at least one data storage unit (6.2) that is present in the storage unit (6).

2. A wireless communication and data storage method (1) as in claim 1 characterized in that in the event that no network topology information (102) is present, the unpacked data is random network coded inside the network coding unit (5.1).

3. A wireless communication and data storage method (1) as in claim 1 characterized in that the storage units (6) are present in a distributed manner, at locations that are independent from each other.

4. A wireless communication and data storage method (1) as in claim 1 characterized in that the unpacked data are merged according to the transmission quality of the transmission channels, in the storage unit (6).

5. A wireless communication and data storage method (1) as in claim 1 characterized in that the same or different wireless communication standards might be utilized on the wireless communication interface (4).

6. A wireless communication and data storage method (1) as in claim 1 characterized in that the packet size of the data that is separated into packets at the load balancing data packer (3) is determined in accordance with the parameters of the wireless communication interface (4), the transmission quality and the data transmission rate of the channel, the present load level at the wireless communication channel (4).

7. A wireless communication and data storage method (1) as in claim 1 characterized in that the parameters of the wireless communication interfaces (4) are set via the load balancing data packer (3).

* * * * *